(12) United States Patent
Tsai et al.

(10) Patent No.: US 11,415,806 B1
(45) Date of Patent: Aug. 16, 2022

(54) HEAD MOUNTED DISPLAY APPARATUS

(71) Applicant: HTC Corporation, Taoyuan (TW)

(72) Inventors: Cheng-Hsiu Tsai, Taoyuan (TW);
Wei-Jen Chang, Taoyuan (TW);
Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/168,173

(22) Filed: Feb. 5, 2021

(51) Int. Cl.
G02B 27/01 (2006.01)
G06F 3/01 (2006.01)
G02B 5/30 (2006.01)

(52) U.S. Cl.
CPC ....... *G02B 27/0172* (2013.01); *G02B 5/3083* (2013.01); *G06F 3/013* (2013.01); *G02B 2027/0118* (2013.01)

(58) Field of Classification Search
CPC .............. G02B 27/0172; G02B 5/3083; G02B 2027/0118; G06F 3/013
See application file for complete search history.

(56) References Cited

U.S. PATENT DOCUMENTS

| | | | |
|---|---|---|---|
| 10,452,138 B1 * | 10/2019 | Sharma | H04N 9/3155 |
| 10,509,228 B1 * | 12/2019 | Sulai | G06F 3/012 |
| 10,785,400 B2 * | 9/2020 | Dutton | H04M 1/0202 |
| 10,901,291 B1 * | 1/2021 | Sulai | G02F 1/29 |
| 11,237,413 B1 * | 2/2022 | Weber | G06F 1/163 |
| 2010/0149073 A1 * | 6/2010 | Chaum | G02B 27/0172 345/8 |
| 2013/0278631 A1 * | 10/2013 | Border | G02C 5/143 345/633 |
| 2015/0002394 A1 * | 1/2015 | Cho | G06V 10/25 345/156 |
| 2016/0327793 A1 * | 11/2016 | Chen | G02B 27/0093 |
| 2017/0003507 A1 * | 1/2017 | Raval | G02F 1/292 |
| 2017/0264879 A1 * | 9/2017 | Zhou | H04N 13/25 |
| 2018/0084232 A1 * | 3/2018 | Belenkii | H04N 13/324 |
| 2019/0094981 A1 * | 3/2019 | Bradski | G02B 27/0093 |
| 2020/0098184 A1 * | 3/2020 | Lo | G06T 19/006 |
| 2020/0150428 A1 * | 5/2020 | Greenberg | G06F 3/013 |

FOREIGN PATENT DOCUMENTS

TW I569040 2/2017

OTHER PUBLICATIONS

"Office Action of Taiwan Counterpart Application", dated Aug. 4, 2021, p. 1-p. 5.

* cited by examiner

Primary Examiner — Ricardo Osorio
(74) Attorney, Agent, or Firm — JCIPRNET

(57) ABSTRACT

A head mounted display apparatus includes a display, a focus adjuster and a controller. The display generates a display image. The focus adjuster is disposed between a target zone and the display, and is configured to adjust a position of a focus plan of the display image according to a control signal. The controller generates the control signal according to vision depth information.

13 Claims, 7 Drawing Sheets

| frame | | 1 | 2 | 3 | 4 | 5 | 6 | 7 | 8 | |
|---|---|---|---|---|---|---|---|---|---|---|
| focus adjuster | | off | on (diopter setting one) | off | on (diopter setting two) | off | on (diopter setting three) | off | on (diopter setting four) | |
| light-shielding element | | off | on | off | on | off | on | off | on | ... |
| eye-ball tracker | | off | sample | off | sample | off | sample | off | sample | |
| display | | no output image | to display an AR image | no output image | to display an AR image | no output image | to display an AR image | no output image | to display an AR image | |

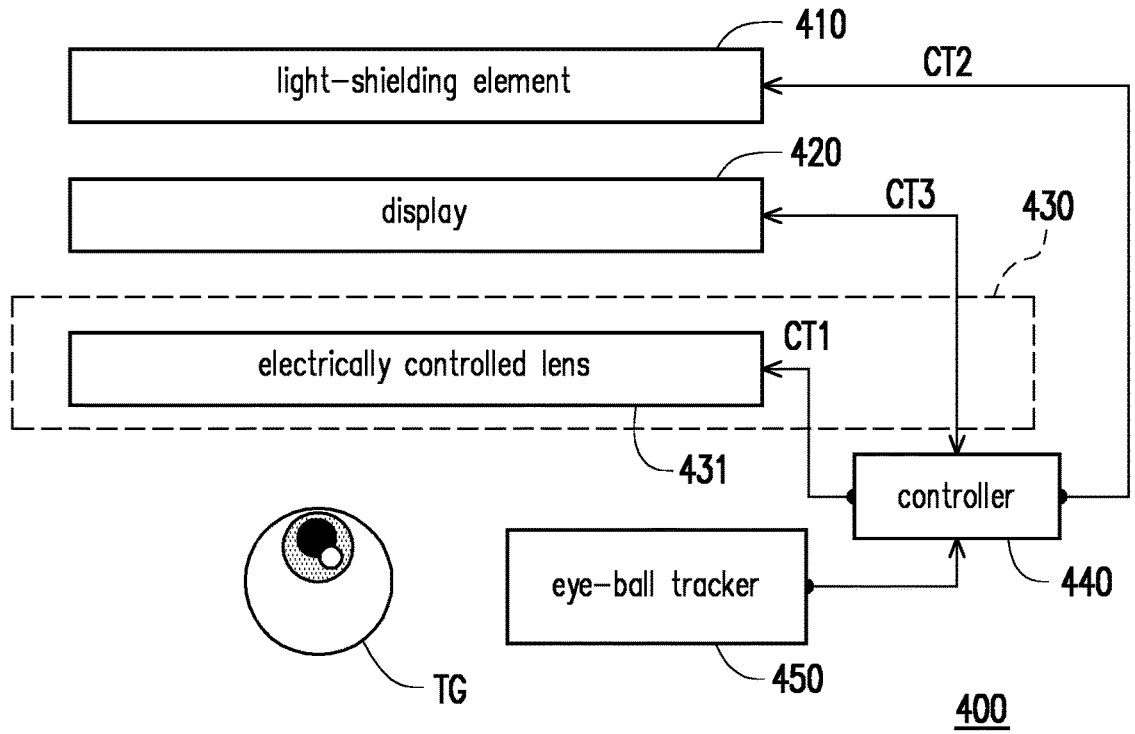

FIG. 5

| frame | | 1 | 2 | 3 | 4 | 5 | 6 | 7 | 8 | |
|---|---|---|---|---|---|---|---|---|---|---|
| focus adjuster | | off | on (diopter setting one) | off | on (diopter setting two) | off | on (diopter setting three) | off | on (diopter setting four) | |
| light-shielding element | | off | on | off | on | off | on | off | on | ... |
| eye-ball tracker | | off | sample | off | sample | off | sample | off | sample | |
| display | | no output image | to display an AR image | no output image | to display an AR image | no output image | to display an AR image | no output image | to display an AR image | |

FIG. 6

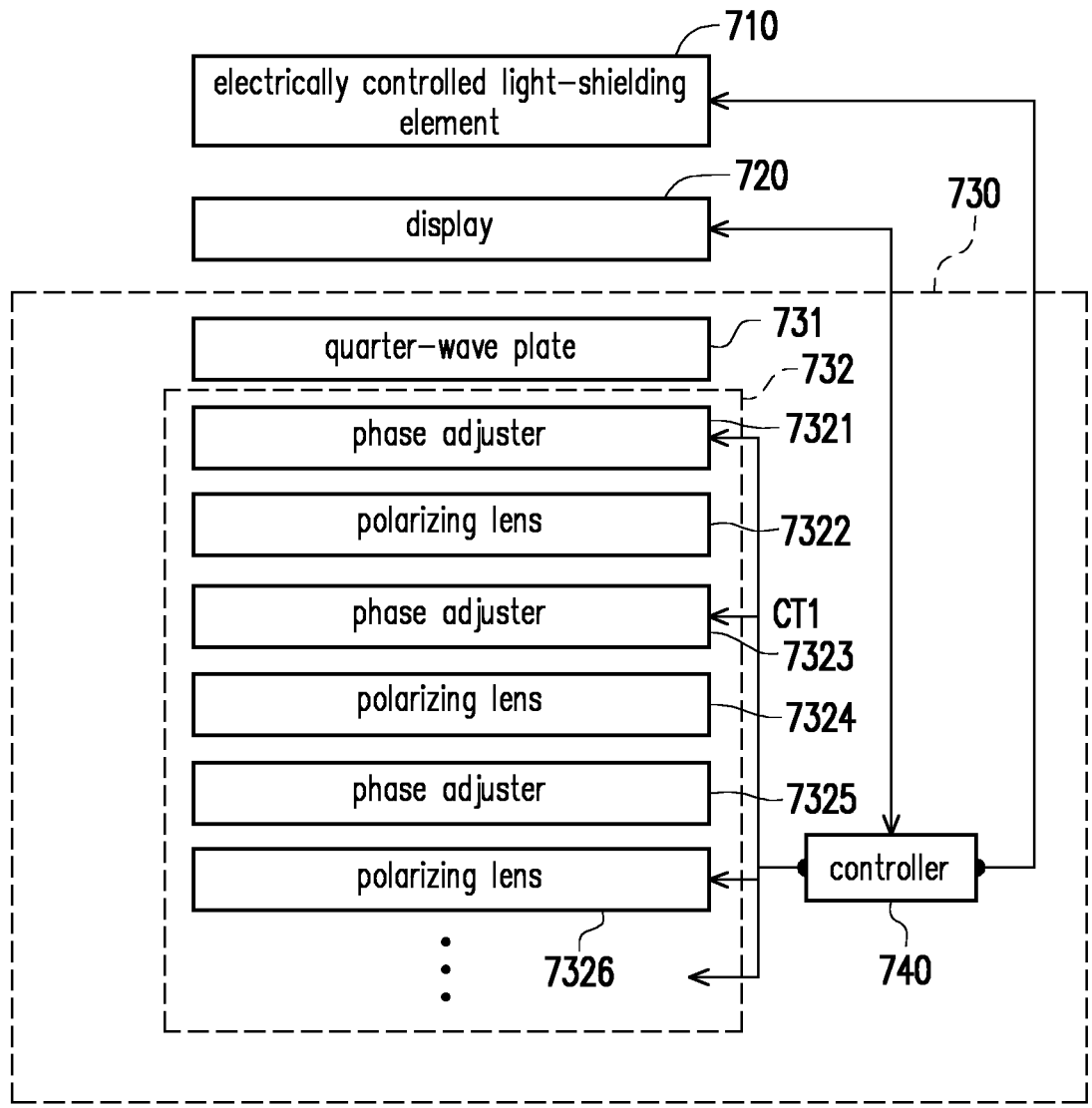
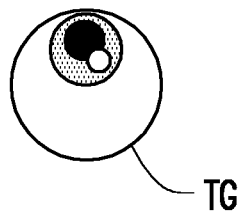
FIG. 8

| | phase adjuster 7321 | | phase adjuster 7323 | | phase adjuster 7325 | | sum of the diopters |
|---|---|---|---|---|---|---|---|
| | polarizing lens 7322 ±1D | | polarizing lens 7324 ±2D | | polarizing lens 7326 ±4D | | |
| | state | diopter | state | diopter | state | diopter | |
| AR image block | on | −1D | on | +2D | off | +4D | +5D |
| AR image block | off | +1D | off | +2D | on | −4D | −1D |

HEAD MOUNTED DISPLAY APPARATUS

BACKGROUND

Technical Field

The disclosure relates to a head mounted display apparatus, particularly to a head mounted display apparatus capable of improving the comfort of the user.

Description of Related Art

In nature, when human eyes look at a near or distant object, the eyes are turned (vergence) to change the diopter of the lenses of the eyeballs through the adjustment of the eyeballs to observe the near object and the distant object properly.

In the optical-path structure of the conventional augmented-reality head mounted display apparatus, whether the object in the display image is a distant object or a near object, the set image focus plane is the same. Therefore, when the user watches the display image, only the changes of eye movement allow the user to perceive the distance of the object in the image, as the visual adjustment function is ineffective, which leads to the generation of the visual vergence accommodation conflict (VAC), thereby affecting the viewing comfort of the user.

SUMMARY

The invention provides a variety of head mounted display apparatuses capable of improving the comfort of the user's visual experience.

The head mounted display apparatus of the present invention includes a display, a focus adjuster, and a controller. The display generates a display image. The focus adjuster is disposed between a target zone and the display for adjusting a position of a focus plane of the display image according to a control signal. The controller is coupled to the focus adjuster for generating the control signal according to visual depth information.

Another head mounted display apparatus of the present invention includes a display, a focus adjuster, a controller, and an eye-ball tracker. The display generates a display image. The focus adjuster is disposed between a target zone and the display for adjusting a position of a focus plane of the display image according to a control signal. The controller is coupled to the focus adjuster for generating the control signal according to visual depth information. The eye-ball tracker is coupled to the controller for detecting the visual depth information of the user in the target zone.

Based on the above, the head mounted display apparatuses of the present invention adjust the position of the focus plane of the display image according to the user's visual depth information through the focus adjuster. In this way, the focus plane of the display image dynamically adjusts the focus plane of the display image according to the user's visual depth, so that the picture seen by human eyes can be the same as the real world, improving the user's visual comfort.

BRIEF DESCRIPTION OF THE DRAWINGS

FIG. 5 is a schematic diagram of a head mounted display apparatus according to another embodiment of the invention.

FIG. 6 is a timing diagram of an operation of a head mounted display apparatus according to an embodiment of the present invention.

FIG. 8 is a schematic diagram of a head mounted display apparatus according to another embodiment of the invention.

DESCRIPTION OF THE EMBODIMENTS

Figure 1:
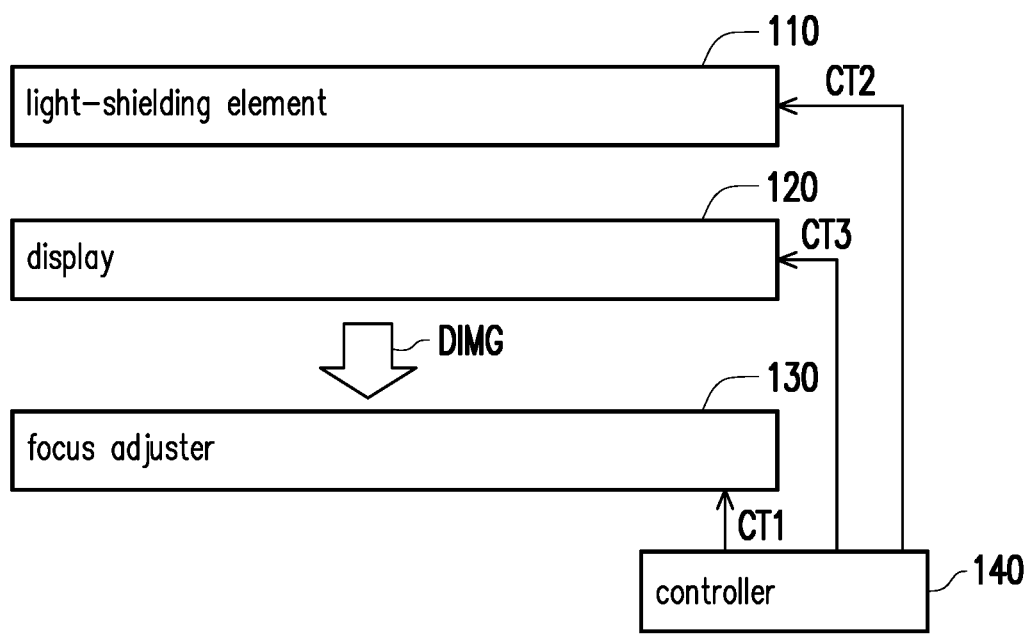
FIG. 1 is a schematic diagram of a head mounted display apparatus according to an embodiment of the invention.

Please refer to FIG. 1. FIG. 1 is a schematic diagram of a head mounted display apparatus according to an embodiment of the invention. A head mounted display apparatus 100 includes a light-shielding element 110, a display 120, a focus adjuster 130, and a controller 140. The light-shielding element 110, the display 120, and the focus adjuster 130 are sequentially coupled and disposed, where the focus adjuster 130 is disposed at a position adjacent to a target zone TG (corresponding to the user's eyeball). The display 120 is adapted to generate a display image DIMG. The controller 140 is coupled to the light-shielding element 110, the display 120, and the focus adjuster 130.

The controller 140 generates control signals CT1 to CT3 according to depth information DI to be displayed. The controller 140 transmits the control signal CT1 to the focus adjuster 130, so that the focus adjuster 130 may adjust the position of a focus plane of the display image DIMG according to the control signal CT1. Here, the focus adjuster 130 may adjust the distance relationship between the focus plane of the display image DIMG and the target zone TG to correspond to the depth information DI. When the depth-of-field value of the object observed by the user at the time is relatively high, the focus adjuster 130 may make the focus plane of the display image DIMG and the target zone TG have a first distance that is relatively great; when the depth-of-field value of the object observed by the user at the time is relatively low, the focus adjuster 130 may make the focus plane of the display image DIMG and the target zone TG have a second distance that is relatively small.

On the other hand, the controller 140 also transmits the control signals CT2 and CT3 to the light-shielding element 110 and the display 120, respectively. The light-shielding element 110 may determine whether to shield an environmental image from the outside according to the control signal CT2. When the light-shielding element 110 is turned on, the environmental image from the outside is shielded and cannot be transmitted to the target zone TG; on the contrary, when the light-shielding element 110 is turned off, the environmental image from the outside can be transmitted to the target zone TG. The display 120 then generates the display image DIMG according to the control signal CT3. The display image DIMG may be virtual reality (VR) or augmented reality (AR) images, and the controller 140 may control the generation timing of the display image DIMG through the control signal CT3.

Figure 2:
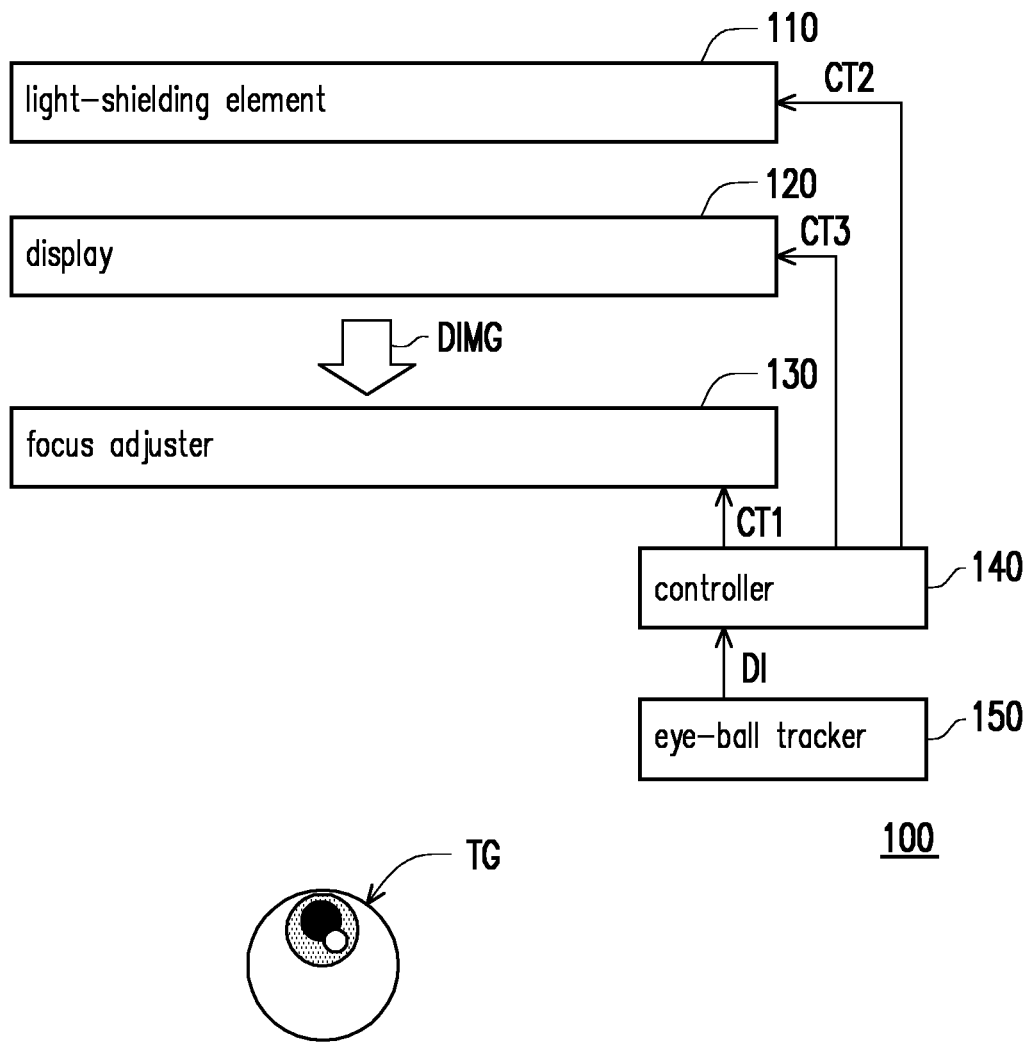
FIG. 2 is a schematic diagram of a head mounted display apparatus according to another embodiment of the invention.

Please refer to FIG. 2. FIG. 2 is a schematic diagram of a head mounted display apparatus according to another embodiment of the invention. A head mounted display apparatus 100 includes a light-shielding element 110, a display 120, a focus adjuster 130, a controller 140, and an eye-ball tracker 150. The light-shielding element 110, the display 120, and the focus adjuster 130 are sequentially coupled and disposed, where the focus adjuster 130 is disposed at a position adjacent to a target zone TG (corresponding to the user's eyeball). The display 120 is adapted to generate a display image DIMG. The controller 140 is coupled to the light-shielding element 110, the display 120, the focus adjuster 130, and the eye-ball tracker 150. The eye-ball tracker 150 is adapted to detect the user's eye state in the target zone TG, and to detect visual depth information DI of the user's eye. Here, the visual depth information DI represents the depth value of the object observed by the user at the time.

The controller 140 receives the visual depth information DI, and generates control signals CT1 to CT3 according to the visual depth information DI. The controller 140 transmits the control signal CT1 to the focus adjuster 130, so that the focus adjuster 130 may adjust the position of the focus plane of the display image DIMG according to the control signal CT1. Here, the focus adjuster 130 may adjust the distance relationship between the focus plane of the display image DIMG and the target zone TG to correspond to the visual depth information DI. When the depth-of-field value of the object observed by the user at the time is relatively high, the focus adjuster 130 may make the focus plane of the display image DIMG and the target zone TG have a first distance that is relatively great; and when the depth-of-field value of the object observed by the user at that time is relatively low, the focus adjuster 130 may make the focus plane of the display image DIMG and the target zone TG have a second distance that is relatively small.

On the other hand, the controller 140 transmits control signals CT2 and CT3 to the light-shielding element 110 and the display 120, respectively. The light-shielding element 110 may determine whether to shield an environmental image from the outside according to the control signal CT2. When the light-shielding element 110 is turned on, the environmental image from the outside is shielded and cannot be transmitted to the target zone TG; on the contrary, when the light-shielding element 110 is turned off, the environmental image from the outside can be transmitted to the target zone TG. The display 120 generates the display image DIMG according to the control signal CT3. The display image DIMG may be virtual reality (VR) or augmented reality (AR) images, and the controller 140 may control the generation timing of the display image DIMG through the control signal CT3.

Figure 3:
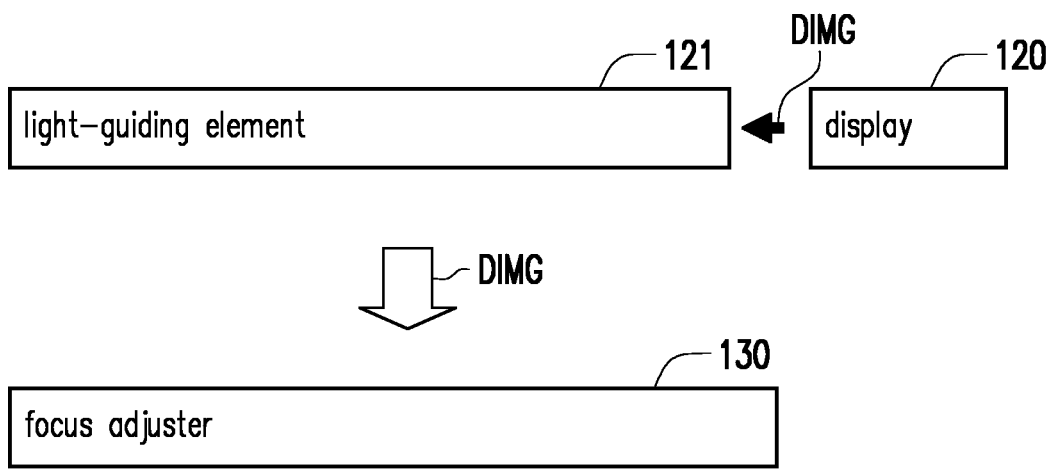
FIG. 3 is a schematic diagram of an embodiment of a display of a head mounted display apparatus according to the embodiment of the present invention.

Regarding the implementation details of the display 120, reference may be made to FIG. 3, a schematic diagram of an embodiment of a display of a head mounted display apparatus according to the embodiment of the present invention. The display 120 may be implemented in cooperation with the light-guiding element 121. The light-guiding element 121 is coupled to the focus adjuster 130, and the display 120 may be disposed on any side of the light-guiding element 121. The display image DIMG generated by the display 120 is projected into the light-guiding element 121. The light-guiding element 121 correctly transmits the display image DIMG to the visual range of the user's eyeball in the target zone. In this embodiment, the light-guiding element 121 may be a waveguide element, a freeform lens, or a half-mirror.

Figure 4:
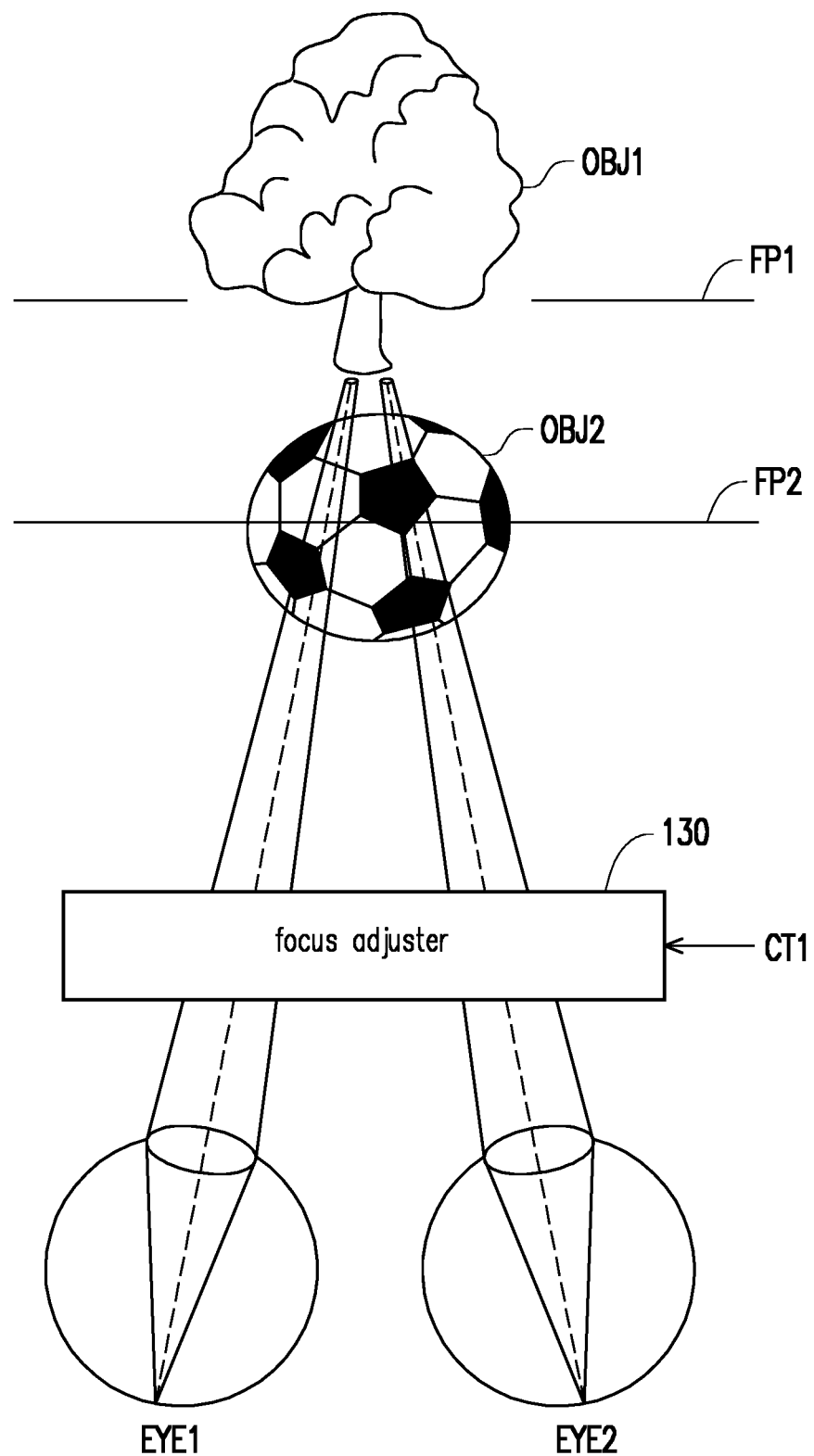
FIG. 4 is a schematic diagram of an operation of a head mounted display apparatus according to an embodiment of the present invention.

Please refer to FIG. 2 and FIG. 4 simultaneously. FIG. 4 is a schematic diagram of an operation of a head mounted display apparatus according to an embodiment of the present invention. In FIG. 4, when there are objects OBJ1 and OBJ2 in the display image, the object OBJ1 has a image depth deeper than the object OBJ2. The focus adjuster 130 of the embodiment of the present invention adjusts the position of the focus plane of the display image to correspond to the visual depth of the user's eyeballs EYE1 and EYE2 according to the control signal CT1. When eyeballs EYE1 and EYE2 look at the object OBJ1, the user's eyeballs EYE1 and EYE2 have a deeper visual depth. At this time, the focus adjuster 130 may adjust the display image to be formed on a focus plane FP1 according to the control signal CT1. In contrast, when the eyeballs EYE1 and EYE2 look at the object OBJ2, the user's eyeballs EYE1 and EYE2 have a shallower visual depth. At this time, the focus adjuster 130 may adjust the display image to be formed on a focus plane FP2 according to the control signal CT1, and the distance between the focus plane FP2 and the eyeballs EYE1 and EYE2 is shorter than the distance between the focus plane FP1 and the eyeballs EYE1 and EYE2.

According to the above description, in the embodiment of the present invention, when the user looks at the object OBJ2 at the nearer end, since the focus adjuster 130 adjusts the display image to be formed on the focus plane FP2 that is relatively close, the object OBJ2 seen by the user is a clear image, and the object OBJ1 seen by the user is a blurred image. When the user looks at the object OBJ2 at the nearer end, since the focus adjuster 130 adjusts the display image to be formed on the focus plane FP1 that is relatively distant, the object OBJ1 seen by the user is a clear image, and the object OBJ2 seen by the user is a blurred image. Such an image display effect may be the same as that in the real world, and the user obtains a better viewing experience.

Please refer to FIG. 5. FIG. 5 is a schematic diagram of a head mounted display apparatus according to another embodiment of the invention. A head mounted display apparatus 400 includes an electrically controlled light-shielding element 410, a display 420, a focus adjuster 430, a controller 440, and an eye-ball tracker 450. In this embodiment, the focus adjuster 430 is composed of an electrically controlled lens 431. The electrically controlled lens 431 may adjust the provided focal length according to the control signal CT1 which is an electrical signal.

In detail, in an embodiment of the present invention, an electronically controlled lens 431 has zero diopter when a control signal CT1 is not received, and does not change the focus plane of the input image. In contrast, the electronically controlled lens 431 may have a non-zero, fixed diopter when receiving the control signal CT1, and change the focus plane of the input image.

In another embodiment of the present invention, an electronically controlled lens 431 adjusts the diopter correspondingly according to the voltage level of the control signal. In this way, the electronically controlled lens 431 may provide multiple diopters corresponding to different voltage levels of the control signal CT1, and adjust the focus plane of the input image accordingly.

Please refer to FIG. 5 and FIG. 6 at the same time. FIG. 6 is a timing diagram of an operation of a head mounted display apparatus according to an embodiment of the present invention. Take the head mounted display apparatus 400 of FIG. 5 as an example. In FIG. 6, the head mounted display apparatus 400 performs operations according to different time intervals (frame periods). In odd-numbered frames, the diopter of the focus adjuster 430 may be zero, and in even-numbered frames 2, 4, 6, and 8, the focus adjuster 430 may be turned on and provide different diopters of one, two, three, and four.

In addition, in odd-numbered frames, the electrically controlled light-shielding element 410 and the eye-ball tracker 450 are both turned off; in even-numbered frames, the electrically controlled light-shielding element 410 and the eye-ball tracker 450 are both turned on. The eye-ball tracker 450 samples the state of the eyeball in even-numbered frames, and provides visual depth information of the eyeball to the controller 440, and the controller 440 generates a control signal CT1 correspondingly to control the diopter of the focus adjuster 430. The size of the diopters one, two, three, and four may be determined according to the voltage level of the control signal CT1, and the controller 440 sets the voltage level of the control signal CT1 according to the visual depth information.

On the other hand, the display 420 does not generate a display image in odd-numbered frames (no output image) according to the control signal CT3, and provides an augmented reality display image (to display an AR image) in even-numbered frames.

Incidentally, the controller 440 provides the control signal CT2 to the electronically controlled light-shielding element 410 in the even-numbered frames, so as to block the environmental image from the outside that may be deformed by the focus adjuster 430, so as to avoid affecting the user's experience. In the odd-numbered frames, the controller 440 does not provide the control signal CT2 to the electrically controlled light-shielding element 410, and causes the electrically controlled light-shielding element 410 to be turned off, so that the environmental image from the outside may be transmitted to the target zone TG.

Figure 7:
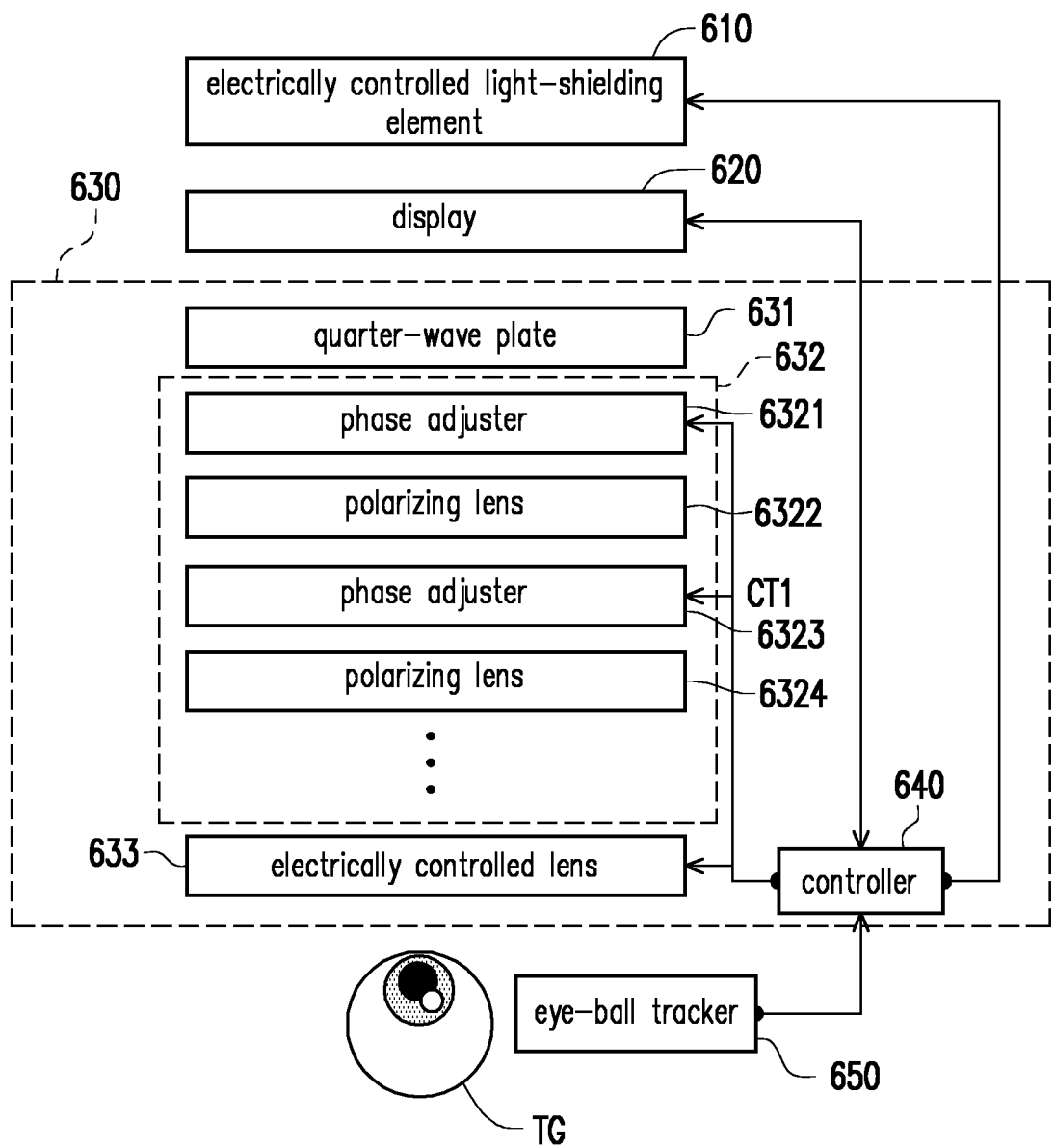
FIG. 7 is a schematic diagram of a head mounted display apparatus according to another embodiment of the invention.

Please refer to FIG. 7. FIG. 7 is a schematic diagram of a head mounted display apparatus according to another embodiment of the invention. A head mounted display apparatus 600 includes an electronically controlled light-shielding element 610, a display 620, a focus adjuster 630, a controller 640, and an eye-ball tracker 650. Different from the foregoing embodiments, the focus adjuster 630 of this embodiment includes a phase retarder (a quarter-wave plate 631), a polarizing lens group 632, and an electrically controlled lens 633. The phase retarder (quarter-wave plate) 631, the polarizing lens group 632, and the electronically controlled lens 633 are sequentially disposed between the display 620 and a target zone TG. The polarizing lens group 632 includes phase adjusters 6321 and 6323 and polarizing lenses 6322 and 6324. The phase adjusters 6321 and 6323 correspond respectively to the polarizing lenses 6322 and 6324 and are coupled to each other. In the implementation of the present invention, the phase adjuster 6321, the polarizing lens 6322, the phase adjuster 6323, and the polarizing lens 6324 are sequentially disposed between the quarter-wave plate 631 and the electrically controlled lens 633. The number of the phase adjusters and the polarizing lenses can be one or more, to which there is no specific limitation.

In addition, the quarter-wave plate 631 is adapted to change the light polarization characteristics of the display image. For example, it converts the display image of linearly polarized light into the display image of circularly polarized light. The phase adjusters 6321 and 6323 are adapted to adjust the polarization characteristics of the incident display image, and the polarizing lenses 6322 and 6324 adjust the diopter provided by the polarization lens according to the rotation characteristics of the display image.

In detail, when the rotation characteristic of the display image is a first rotation direction (right-handed optical rotation), the diopter of the polarizing lens 6322 and 6324 is adjusted to a positive reference value (+D), and when the rotation characteristic of the display image is a second rotation direction (left-handed optical rotation), the diopter of the polarizing lenses 6322 and 6324 is adjusted to a negative reference value (−D). The sum of the diopters of the above polarizing lenses 6322 and 6324 provides a total diopter and be used as a basis for adjusting the position of the focus plane.

Please refer to FIG. 8. FIG. 8 is a schematic diagram of a head mounted display apparatus according to another embodiment of the invention. A head mounted display apparatus 700 includes an electrically controlled light-shielding element 710, a display 720, a focus adjuster 730, and a controller 740. The focus adjuster 730 includes a phase retarder (a quarter-wave plate 731) and a polarizing lens group 732. The polarizing lens group 732 includes a plurality of phase adjusters 7321, 7323, and 7325 and polarizing lenses 7322, 7324, and 7326 that are alternately coupled.

Each of the phase adjusters 7321, 7323, and 7325 in the embodiment of the present invention may be composed of a plurality of phase adjustment members. The phase adjustment members can be independently controlled according to a plurality of bits of a control signal CT1. In other words, different areas of a single phase adjuster (taking the phase adjuster 7321 as an example) can provide different phase shifts corresponding to different parts of the display image. Therefore, in the embodiment of the present invention, for objects with relatively deep depth of field in the display image, the phase adjusters 7321, 7323, and 7325 provide a relatively large amount of phase shift, so that the corresponding polarizing lens provides relatively high diopter; for objects with relatively close depth of field in the display image, the phase adjusters 7321, 7323, and 7325 provide relatively little phase shift, so that the corresponding polarizing lens provides relatively low diopter.

Figures 9, 10:
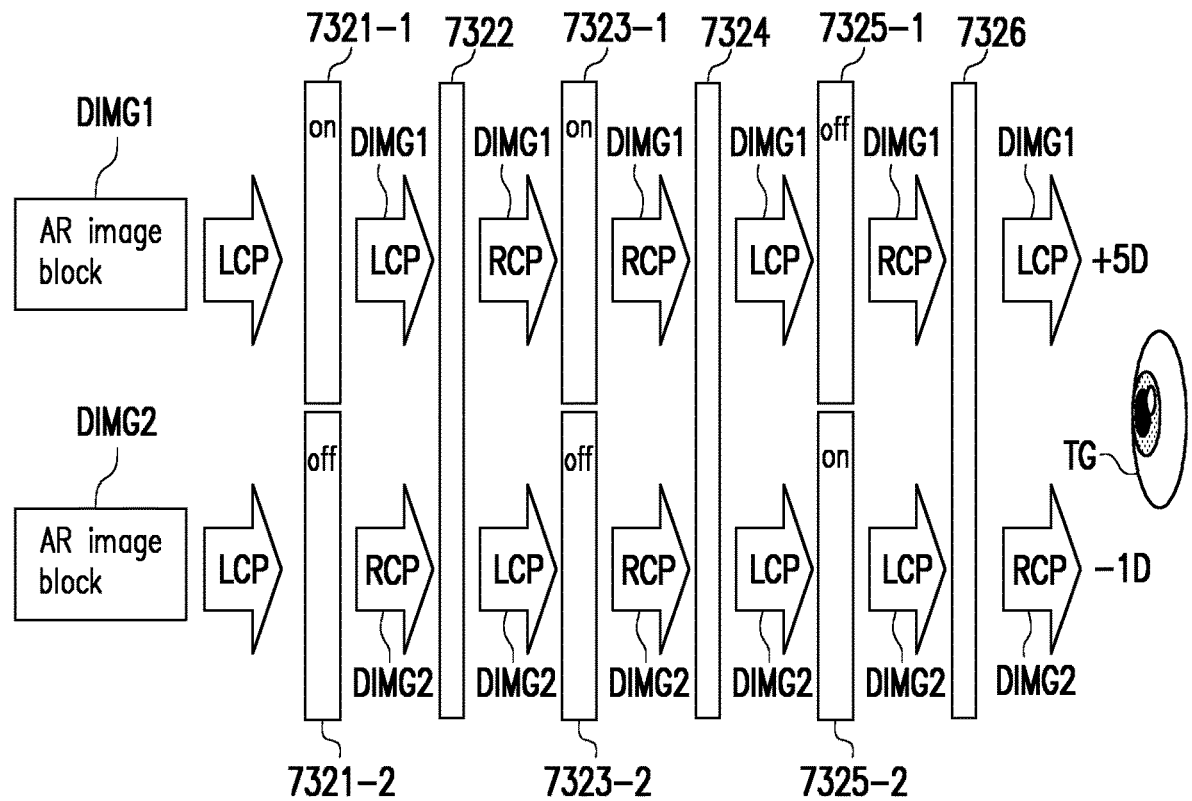
FIG. 9 and FIG. 10 are schematic diagrams showing the operation of the head mounted display apparatus in the embodiment of FIG. 8 of the present invention.

For details of the setting of the diopter, please refer to FIG. 9 and FIG. 10. FIG. 9 and FIG. 10 are schematic diagrams showing the operation of the head mounted display apparatus in the embodiment of FIG. 8 of the present invention. In this embodiment, polarizing lenses 7322, 7324, and 7326 respectively increase different diopters. Moreover, the display screen may be divided into AR screen blocks DIMG1 and DIMG2 according to the depth of field of the object. The AR image blocks DIMG1 and DIMG2 are both circularly polarized light (LCP) in a second rotation direction, a first-part phase adjuster 7321-1 receives the AR image block DIMG1, and a second-part phase adjuster 7321-2 receives the AR frame DIMG2. Based on the condition that the first-part phase adjuster 7321-1 is turned on and the second-part phase adjuster 7321-2 is turned off, the AR image block DIMG1 maintains the circularly polarized light in the second rotation direction to be transmitted to the polarizing lens 7322; the AR image block DIMG2 is changed to circularly polarized light (RCP) in the first rotation direction to be transmitted to the polarizing lens 7322.

Corresponding to the AR image block DIMG1 as LCP, the area of the polarizing lens 7322 that corresponds to the AR image block DIMG1 provides a diopter of −1D; corresponding to the AR image block DIMG2 as RCP, the area of the polarizing lens 7322 that corresponds to the AR image block DIMG1 provides a diopter of +1D. The AR image block DIMG1 that penetrates the polarizing lens 7322 is changed to RCP, and the AR image block DIMG2 that penetrates the polarizing lens 7322 is changed to LCP.

Then, the first-part phase adjuster 7321-1 receives the AR image block DIMG1 as RCP, and the second-part phase adjuster 7321-2 receives the AR image block DIMG2 as LCP. Based on the condition that the first-part phase adjuster 7321-1 is turned on and the second-part phase adjuster 7321-2 is turned off, the AR image block DIMG1 remains as RCP to be transmitted to the polarizing lens 7324; the AR image block DIMG2 is changed to RCP to be transmitted to the polarizing lens 7324.

Corresponding to the AR image blocks DIMG1 and DIMG2 that are both RCP, the polarizing lens 7324 may provide a diopter of +2D. And the AR image blocks DIMG1 and DIMG2 that penetrate the polarizing lens 7322 are both changed to LCP.

Next, a first-part phase adjuster 7325-1 receives the AR image block DIMG1 as LCP, and a second-part phase adjuster 7325-2 receives the AR image block DIMG2 as LCP. Based on the condition that the first-part phase adjuster 7325-1 is turned off and the second-part phase adjuster 7325-2 is turned on, the AR image block DIMG1 is changed to RCP to be transmitted to the polarizing lens 7326; the AR image block DIMG2 remains as LCP to be transmitted to the polarizing lens 7326.

Corresponding to the AR image block DIMG1 of RCP, the area of the polarizing lens 7326 that corresponds to the AR image block DIMG1 provides a diopter of +4D; corresponding to the AR image block DIMG2 of the LCP, the area of the polarizing lens 7326 that corresponds to the AR image block DIMG1 provides a diopter of −4D. The AR image block DIMG1 that penetrates the polarizing lens 7326 is changed to LCP, and the AR image block DIMG2 that penetrates the polarizing lens 7326 is changed to RCP.

When calculating the sum of the diopters of the polarizing lens 7322 to 7326, the part of the polarizing lens 7322 to 7326 corresponding to the AR image block DIMG1 provides a total diopter of +5D, and the part corresponding to the AR image block DIMG2 provides a total diopter of −1D.

Incidentally, the polarizing lens 7322 of this embodiment may adjust the diopter to +1D or −1D according to the rotation characteristics of the display image; the polarizing lens 7324 may adjust the diopter to +2D or −2D according to the rotation characteristics of the display image; and the polarizing lens 7326 may adjust the diopter to +4D and −4D according to the rotation characteristics of the display image.

In the above description, regarding the adjustment amounts of the diopter of the polarizing lenses 7322 to 7326 as well as the corresponding on-or-off states of the respective parts of the phase adjusters 7321, 7323, and 7325, they can be seen clearly in FIG. 10.

In this embodiment, by controlling the on-or-off of multiple parts of the phase adjusters, multiple areas of the focus adjuster 730 is provided with different diopters, and different focus planes may be set for multiple parts of the display image DIMG. In this way, the head mounted display apparatus 700 adjusts the position of the focus plane of the display image effectively according to the user's visual depth, improving the user's visual comfort, and allowing the user to obtain a better viewing experience.

In summary, the head mounted display apparatuses of the present invention detect the visual depth of the user, and adjust the focus plane provided by the focus adjuster according to the obtained visual depth information. In this way, the picture of the display image viewed by the human eyes may be the same as that in the real world, improving the comfort of the user's visual experience.

What is claimed is:

1. A head mounted display apparatus, comprising:
   a display, generating a display image, wherein the display image comprises a first object and a second object having image depths that are different from each other;
   a focus adjuster, disposed between a target zone and the display, for adjusting a position of a focus plane of the display image according to a control signal, wherein the position of the focus plane is overlapped with the first object and is distanced from the second object; and
   a controller, coupled to the focus adjuster, for generating the control signal according to visual depth information,
   wherein the focus adjuster is turned on and off in a plurality of first time intervals, and the visual depth information is detected in a plurality of second time intervals, each of the first time intervals and each of the second time intervals are alternate without overlapping with each other.

2. A head mounted display apparatus, comprising:
   a display, generating a display image, wherein the display image comprises a first object and a second object having image depths that are different from each other;
   a focus adjuster, disposed between a target zone and the display, for adjusting a position of a focus plane of the display image according to a control signal, wherein the position of the focus plane is overlapped with the first object and is distanced from the second object;
   a controller, coupled to the focus adjuster, for generating the control signal according to visual depth information; and
   an eye-ball tracker, coupled to the controller, for detecting the visual depth information of a user in the target zone,
   wherein the focus adjuster is turned on and off in a plurality of first time intervals, and the visual depth information is detected in a plurality of second time intervals, each of the first time intervals and each of the second time intervals are alternate without overlapping with each other.

3. The head mounted display apparatus according to claim 2, further comprising:
   a light-guiding element, coupled to the display, for guiding the display image to the target zone.

4. The head mounted display apparatus according to claim 2, further comprising:
   a light-shielding element, coupled to the display, for determining whether to shield an environmental image.

5. The head mounted display apparatus according to claim 4, wherein the focus adjuster comprises:
   an electrically controlled lens, coupled to the controller, for changing the focus plane according to the control signal that is an electrical signal.

6. The head mounted display apparatus according to claim 5, wherein the electronically controlled lens adjusts the focus plane according to a voltage value of the control signal.

7. The head mounted display apparatus according to claim 5, wherein the light-shielding element and the focus adjuster are turned on and off in the plurality of first time intervals, the eye-ball tracker is activated in the plurality of second time intervals to detect the visual depth information, the electronically controlled lens is activated in the second time intervals to adjust a provided focal length according to the corresponding visual depth information, and the focus adjuster is capable of adjusting the focal length while performing vision correction at the same time according to the user's needs, so as to allow the user to see the environmental image clearly.

8. The head mounted display apparatus according to claim 5, wherein: when the electronically controlled lens is activated, the light-shielding element is activated to shield the environmental image; and the display is activated in the second time intervals to generate the display image, and is stopped in the first time intervals from generating the display image.

9. The head mounted display apparatus according to claim 5, wherein the focus adjuster comprises:
   a phase retarder, disposed between the display and the electronically controlled lens, for changing light polarization characteristics of the display image; and
   a polarizing lens group, disposed between the phase retarder and the electronically controlled lens, for changing the focus plane of the display image.

10. The head mounted display apparatus according to claim 9, wherein the polarizing lens group comprises:
   at least one phase adjuster, for adjusting a rotation characteristic of the display image according to the control signal; and
   at least one polarizing lens, for adjusting a diopter of the at least one polarizing lens according to the rotation characteristic of the display image,
   wherein the at least one phase adjuster and the at least one polarizing lens are sequentially disposed between the phase retarder and the electronically controlled lens.

11. The head mounted display apparatus according to claim 10, wherein when the rotation characteristic of the display image is a first rotation direction, the diopter of the at least one polarizing lens is adjusted to a positive reference value, wherein when the rotation characteristic of the display image is a second rotation direction, the diopter of the at least one polarizing lens is adjusted to a negative reference value, wherein the first rotation direction is opposite to the second rotation direction.

12. The head mounted display apparatus according to claim 11, wherein the at least one phase adjuster comprises a plurality of phase adjustment members, the phase adjustment members adjust the display image from a first rotation direction to a second rotation direction that is opposite to the first rotation direction according to the control signal, or adjust the display image from the second rotation direction to the first rotation direction.

13. The head mounted display apparatus according to claim 12, wherein the phase adjustment members are capable of being respectively controlled independently according to a plurality of bits of the control signal.

* * * * *